United States Patent [19]

Sellar

[11] Patent Number: 5,356,081
[45] Date of Patent: Oct. 18, 1994

[54] APPARATUS AND PROCESS FOR EMPLOYING SYNERGISTIC DESTRUCTIVE POWERS OF A WATER STREAM AND A LASER BEAM

[75] Inventor: John G. Sellar, Lakewood, Colo.

[73] Assignee: Electric Power Research Institute, Inc., Palo Alto, Calif.

[21] Appl. No.: 21,911

[22] Filed: Feb. 24, 1993

[51] Int. Cl.$^5$ .................................... B02C 19/18
[52] U.S. Cl. .................................... 241/1; 219/121.62
[58] Field of Search ............. 241/1, 17; 299/14, 16; 241/33, 65 219/121.62, 121.69, 121.71, 121.72, 121.84, 121.85

[56] References Cited

U.S. PATENT DOCUMENTS

| | | | |
|---|---|---|---|
| 3,451,008 | 6/1969 | Dunne | 331/94.5 |
| 3,473,741 | 10/1969 | Bodine | 241/30 |
| 3,556,600 | 1/1971 | Shoupp et al. | 241/1 X |
| 3,756,344 | 9/1973 | Daiber et al. | 181/0.5 NP |
| 3,873,938 | 3/1975 | Milling | 331/94.5 |
| 3,982,208 | 9/1976 | Camac | 331/94.5 G |
| 4,276,463 | 6/1981 | Kime | 219/121 LB |
| 4,401,477 | 8/1983 | Clauer et al. | 148/4 |
| 4,414,038 | 11/1983 | Dausinger | 148/4 |
| 4,708,752 | 11/1987 | Kar | 148/127 |
| 4,932,954 | 6/1990 | Wondrazek et al. | 606/128 |
| 4,937,421 | 6/1990 | Ortiz et al. | 219/121.68 |
| 5,004,166 | 4/1991 | Sellar | 241/36 |
| 5,023,424 | 6/1991 | Vaught | 219/121.6 |
| 5,127,019 | 6/1992 | Epstein et al. | 372/108 |

OTHER PUBLICATIONS

Koucky J, "Laser Shock Processing for Fatigue Improvement", Sep. 15–16, 1992, Chicago, ILL.
Sellar J, "Pulsed Laser Fragmentation of Rock", Nov. 1992.

*Primary Examiner*—Douglas D. Watts
*Attorney, Agent, or Firm*—James W. Maccoun

[57] ABSTRACT

The present invention is a novel apparatus for excavating a mass, such as a rock. The present invention directs a high velocity fluid stream onto a mass and simultaneously directs a pulsing laser beam onto the same mass. The laser beam vaporizes material and the fluid confines the vaporized material causing shock waves to enter the rock. The confined shock waves impart greater force than non-confined shock waves and this greater force fractures the mass. The fluid stream also washes loose particles from the mass to provide a new excavation surface.

20 Claims, 10 Drawing Sheets

APPARATUS AND PROCESS FOR EMPLOYING SYNERGISTIC DESTRUCTIVE POWERS OF A WATER STREAM AND A LASER BEAM

BACKGROUND OF THE INVENTION

1. Field of Invention

This invention relates to the field of using laser energy for fracturing a mass such as a rock.

2. Description of the Related Art

Fracturing or breaking solid materials is a method used by mining as well as other industries. Fracturing is done by drilling, blasting, scraping, ripping, chipping and cutting. Water-jet drills are used for exploration and blasting in loose or weakly bonded materials. Hydraulic mining uses jets or streams of water for excavation of loose materials. U.S. Pat. No. 5,004,166 describes an apparatus that uses a pulsing laser to fracture masses, such as rocks. The apparatus of U.S. Pat. No. 5,004,166, also uses a monitoring laser beam for measuring the resonant frequency of rocks. The pulsing laser beam is adjusted to match that resonant frequency. Pulsing the laser beam at the resonant frequency of a rock imparts more destructive energy than is imparted by pulsing at other frequencies. The inventor of the present invention invented U.S. Pat. No. 5,004,166. U.S. Pat. No. 5,004,166 is incorporated herein by reference.

Conventional streams of water have not proven useful for excavating hard rock unless pressurized water can invade pre-existing cracks. Conventional laser beams (short pulses or continuous beams) have provided neither economical nor practical means of excavating hard rock.

SUMMARY OF THE INVENTION WITH OBJECTS

It is a general object of this invention to provide an improved apparatus for mining, excavation, tunneling, highway construction, demolition, and other industries involving fracture of masses.

It is another object of this invention to substantially increase the amplitude of shock waves imparted to a mass from each laser pulse as compared to such amplitude for either no fluid or a thin fluid layer on the mass.

It is another object of this invention to use a fluid stream to perform excavation while simultaneously using laser energy for excavation.

It is another object of this invention to use a laser to create cracks and fissures in rock and to simultaneously use a fluid stream to invade those fissures.

It is another object of this invention to provide to an excavating laser beam access to an excavation face which access is clear and constant even in the presence of fog and dirt.

It is another object to flush loose particles from an excavation face to ensure constant access of an excavating laser beam to a fresh surface.

It is another object of this invention to provide a pumping medium to export excavated rock particles away from mining faces.

It is still another object of this invention to provide an alternative to the use of explosives for mining and excavation.

The present invention is a novel apparatus that accomplishes these and other objects by excavating a mass in a novel fashion. The present invention directs a high velocity fluid stream onto a mass and simultaneously directs a pulsed laser beam onto the same mass. The pulsed laser beam (referred to as the "fracturing laser beam") vaporizes material from the rock surface and the fluid confines the vapor to the rock, thereby creating a shock wave in both the rock and the fluid. The shock wave produced by the confined vapor imparts greater force than non-confined vapor. This greater force more readily fractures the mass. The fluid stream also washes loose particles from the mass to provide a new excavation surface.

This apparatus has a fluid conduit with a fluid outlet for directing the fluid stream. The apparatus emits the fracturing laser beam from the fluid outlet as fluid flows through the fluid outlet. The fluid stream and the fracturing laser beam both travel on one path to the excavation surface. The fluid stream forms a cylindrical fluid envelope that is approximately coaxial with the fracturing laser beam. Thus, the fluid envelope longitudinally surrounds the fracturing laser beam within this envelope as the fracturing laser beam travels from the apparatus to the excavation face. In another embodiment, the fluid stream and the fracturing laser beam are aimed from different angles at a particular location on the mass.

An embodiment of the present invention also uses another laser beam (as described in U.S. Pat. No. 5,004,166) to monitor the resonant frequency of the mass. This other laser beam is referred to below as the "monitoring laser beam." The monitoring laser beam is used to match the pulse frequency of the fracturing laser beam to the resonant frequency of the mass.

The apparatus emits the monitoring laser beam from the fluid outlet during fluid flow. The fluid stream, the fracturing laser beam, and the monitoring laser beam all travel on one path to the excavation surface. The fluid stream forms a fluid envelope that longitudinally surrounds the monitoring laser beam within this envelope as the fracturing laser beam travels from the apparatus to the excavation face. This fluid envelope may also simultaneously surround the fracturing laser beam. Alternatively, the monitoring laser beam and the fluid stream are aimed from different angles to intersect a particular location on the mass.

DETAILED DESCRIPTION OF THE PRESENT INVENTION

Laser radiation having wavelengths between 1.5 and 0.3 microns is transmissible through water. A layer of water covering the surface of hard rock confines vaporization caused by high power density laser pulses. Confinement considerably enhances the amplitude of shock waves produced in the rock. The present invention uses these enhanced shock waves to excavate masses such as rocks. The discussion that follows assumes that the mass to be excavated is a rock. However, the present invention is useful for excavation of other types of masses such as concrete and brick and various types of surface coatings including rust. The discussion that follows also assumes that the fluid is water. However, the present invention is useful with other types of fluid such as non-flammable mineral and vegetable oils. It is necessary, however, that the fluid be transparent to wavelengths of the fracturing laser beam.

In a laboratory procedure, the present inventor observed that a single laser pulse having a wavelength of approximately 1.06 microns, a pulse time of 40 nanoseconds and an energy density of 200 joules per square centimeter ($200J/cm^2$) showed no visible effect on a dry specimen of iron ore rock. However, the same single pulse excavated the rock surface when water flowed over the specimen. The preferred fracturing laser beam used in the present invention is described in detail below.

The present invention has a water conduit with a nozzle. The nozzle converts pressurized water into a high velocity water stream. The velocity of the water stream is preferably not less than 140 feet per second when the horizontal distance between the nozzle and rock face is 24 inches. If the nozzle is aimed vertically downwards, the velocity required is much less, but preferably not less than 20 feet per second.

The nozzle directs this stream onto a particular location on a rock and uses a fracturing laser beam to impart concentrated laser energy at that location. The water stream and the fracturing laser beam are disposed with their axes coaxial or nearly coaxial so that both intersect the rock at the particular location. The present invention achieves certain benefits only if the laser beam is surrounded by the envelope of the water stream. For example, when contained within the envelope of the water stream, the fracturing laser beam receives constant clear access to the rock face. This access is clear even in the presence of fog, dust, and other debris normally found at an excavation face.

The nozzle is positioned to be preferably not more than 36 inches from the rock face since the water stream curves downward under the influence of gravity and since turbulence within the water and friction between the water and air may cause the water stream eventually to pull air along with it and to allow penetration of the air into the water stream. Presence of air in the water stream could undesirably deflect the laser beams used in the present invention.

The fracturing laser beam need not be surrounded by the envelope of the stream in order to achieve some of the benefits of the present invention. Some of the benefits of the present invention are achieved if the water stream and the fracturing laser beam travel separate paths to intersect at the rock. For example, water confines vaporization caused by laser pulses even if the water arrives at a particular location from an angle other than that of the laser pulses.

In a second embodiment, the conduit and the lens system have a mirror chamber interposed between them. A one-way mirror in the mirror chamber allows the fracturing laser beam to pass from the lens chamber into a flow chamber within the conduit. The fracturing laser beam transmits through the flow chamber, exits the conduit by way of the water outlet, and then impinges onto the rock. However, this one-way mirror reflects fracturing laser beam radiation that may return after reflection off the rock. The one-way mirror thus prevents reflections of the fracturing laser beam from damaging the interior of the excavator.

In a third embodiment, a monitoring laser beam is used to monitor the resonant frequency of the rock. The pulse frequency of the fracturing laser beam is continuously adjusted to match that resonant frequency. A selective mirror supplements the one-way mirror. The selective mirror and the one-way mirror direct the monitoring laser beam through the conduit using the path that the fracturing laser beam follows after the fracturing laser beam passes through the one-way mirror. First the selective mirror reflects the monitoring laser beam onto the one-way mirror. Then the one-way mirror reflects the monitoring laser beam onto the rock. The rock reflects the monitoring laser beam back through the conduit to the one-way mirror. The one-way mirror reflects the returning monitoring laser beam to the selective mirror. The selective mirror then reflects the returning monitoring laser beam to a means for evaluating the returning monitoring laser beam. The fracturing laser beam is adjusted to match the resonant frequency of the rock. Use of a monitoring laser beam to measure the resonant frequency of a rock and adjusting a fracturing laser beam to match that resonant frequency are discussed in U.S. Pat. No. 5,004,166, referred to above.

Having generally disclosed the present invention, the following discussion provides a detailed disclosure of the present invention.

In the following disclosure, alpha denotes the wavelength of the fracturing laser beam and beta denotes the wavelength of the monitoring laser beam. Alpha preferably includes wavelengths of from 0.3 to 1.5 microns. Beta also preferably includes wavelengths of from 0.3 to 1.5 microns. However, for reasons which will become apparent from the discussion below, alpha and beta are selected to be different wavelengths with respect to each other.

Figure 1:
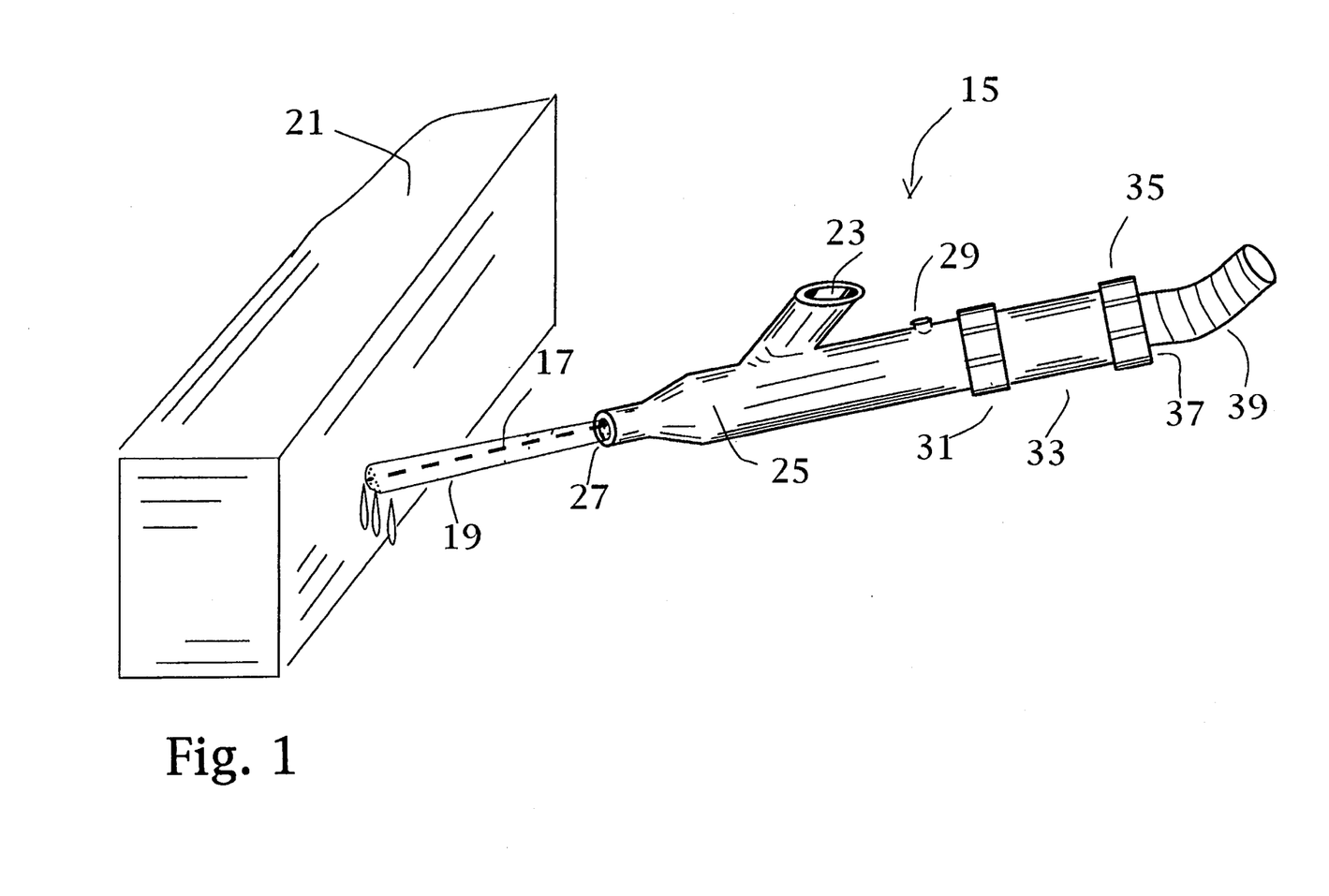
FIG. 1 shows a perspective view of the first embodiment of an excavator of the present invention. This view shows how the invention uses a pulsing laser beam surrounded by a stream of water to fracture a rock.

FIG. 1 shows a perspective view both of the first embodiment of excavator 15 of the present invention and of the manner of use of excavator 15. This view shows how the invention uses fracturing laser beam 17 surrounded by the cylindrical envelope of water stream 19 to fracture rock 21. Fracturing laser beam 17 is a laser beam having suitable characteristics (described below) to impart shock waves into rock 21. Excavator 15 includes water inlet 23, water conduit 25, water outlet 27, bleed valve 29, lens chamber connector 31, lens chamber 33, first fiber optic connector 35, first fiber optic delivery head 37, and fiber optic cable 39. (The excavator 15 will work equally well with the fracturing laser directly connected to the lens chamber 33 without using the fiber optic cable 39 or fiber optic head 37.) This figure shows the cylindrical shape of water stream 19 as water stream 19 travels from water outlet 27 to rock 21. Fracturing laser beam 17 is approximately coaxial with water stream 19.

Figure 2:
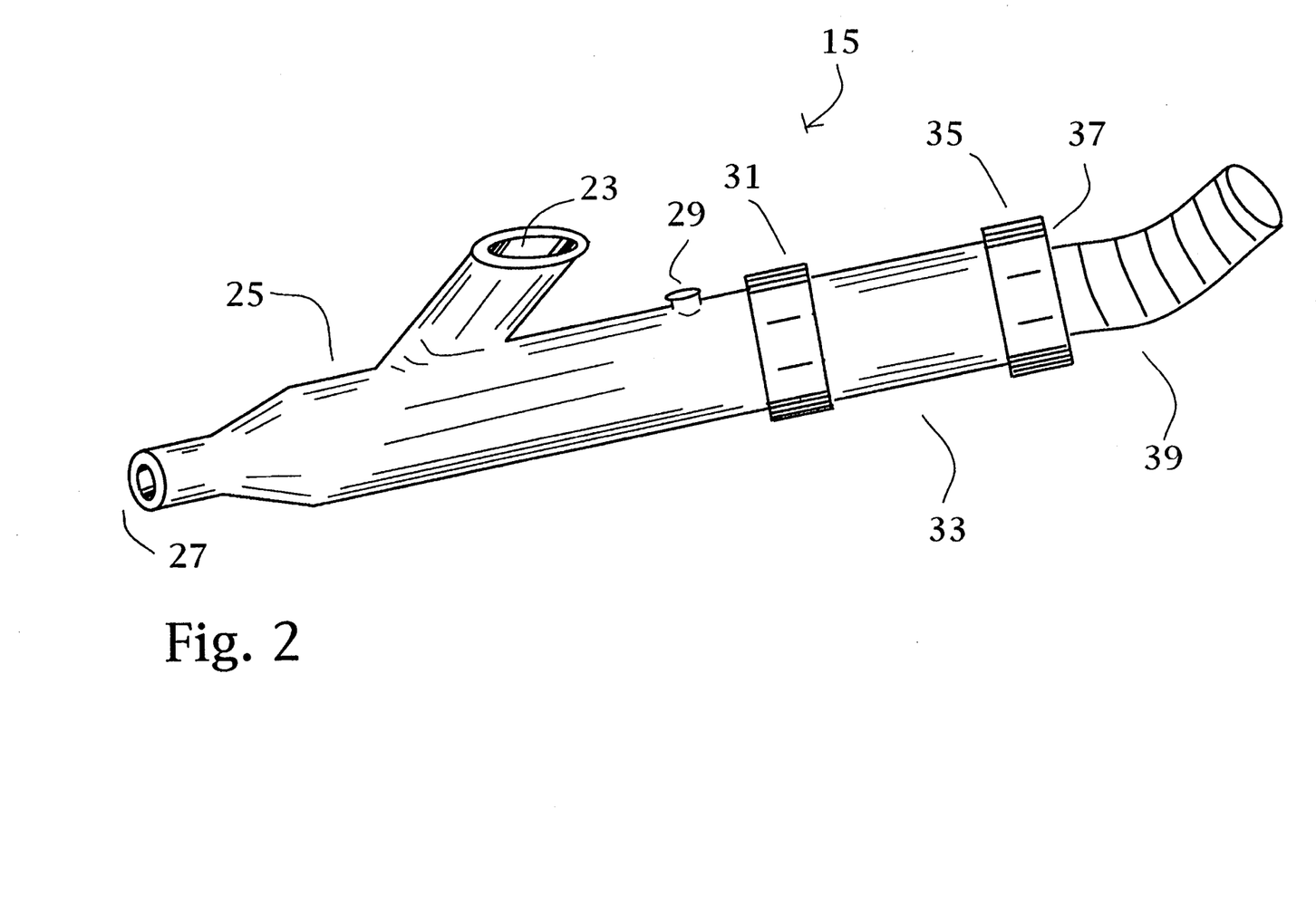
FIG. 2 shows a perspective view of the conduit shown in FIG. 1. In this view, the rock and water stream of FIG. 1 are not shown.

FIG. 2 shows a perspective view of the first embodiment of excavator 15 disconnected from the manner of use of excavator 15.

Figure 3:
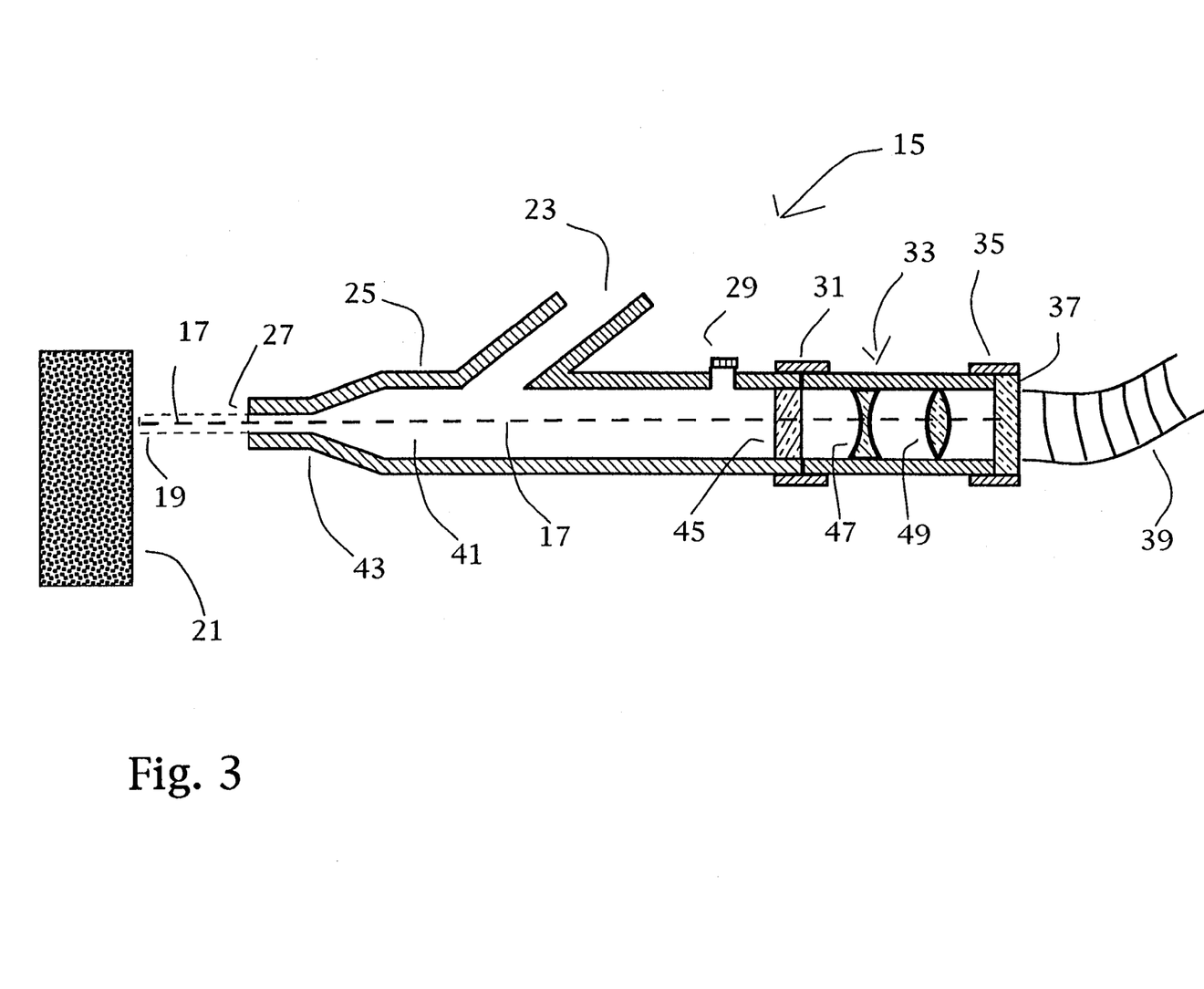
FIG. 3 shows the excavator of FIG. 1 in longitudinal sectional side view. This view illustrates a fluid flow chamber and a lens chamber having a lens system.

FIG. 3 illustrates a sectional side view of the first embodiment of excavator 15. Pressurized water flows through water inlet 23 into flow chamber 41 which is within conduit 25. Pressurized water then flows through nozzle 43 and then emerges from conduit 25 by way of water outlet 27 where the pressurized water forms water stream 19. With nozzle 43 having a diameter of approximately 0.2 inches and with water pressure within flow chamber 41 at approximately 150 psig, then water stream 19 will have a velocity of approximately 140 feet per second measured at water outlet 27. At such speeds, one could characterize water stream 19 as a "water-jet." The present invention operates with lower water speeds but high water velocity gives water stream 19 its own excavating force resulting from kinetic energy imparted by water stream 19.

Air that is trapped within flow chamber 41 is removed using bleed valve 29 so that fracturing laser beam 17 does not encounter air-water interfaces which may distort and deflect the fracturing laser beam 17 due to the different refractive indices of air and water.

Lens chamber connector 31 attaches conduit 25 to lens chamber 33. Lens chamber connector 31 is a conventional female threaded connector and conduit 25 has matching male threads. Other connectors used in the present invention are of similar construction but connectors such as bolted flanges could also be used throughout. Diametrically opposite lens chamber connector 31 the first fiber optic connector 35 connects first fiber optic delivery head 37 to lens chamber 33.

Flow chamber window 45 is transparent to laser radiation having wavelengths alpha and beta. Fracturing laser beam 17 passes through flow chamber window 45 into flow chamber 41 and then passes through conduit 25 by way of flow chamber 41. It should be noted that fracturing laser beam 17 is approximately coaxial with a longitudinal axis through excavator 15 to exit conduit 25 by way of water outlet 27.

Lens chamber 33 houses a lens system for focusing fracturing laser beam 17 onto rock 21. The lens system has biconcave lens 47 and biconvex lens 49 which provides a lens aiming means. Biconcave lens 47 and biconvex lens 49 are on an optical axis passing longitudinally through flow chamber 41. Relative axial positions of biconcave lens 47 and biconvex lens 49 are adjustable to provide focal points of selectable distances. These focal points are selected to adjust for the distance from water outlet 27 to rock 21. While FIG. 3 shows biconcave lens 47 near flow chamber window 45 and shows biconvex lens 49 near first fiber optic delivery head 37, reversing this lens order can have equivalent results, depending on whether the fracturing laser beam 17 emanating from the first fiber optic cable 39 requires focusing followed by collimation or requires defocusing followed by collimation. Lens chamber 33 is filled with a fluid such as water. This fluid is optically transparent to wavelengths both alpha and beta. Flow chamber window 45 protects the lens system within lens chamber 33 from elevated water pressures that are within flow chamber 41.

Biconcave lens 47 and lens 49 are positioned to provide a flux density of the pulsed radiation below 100 Gigawatts per square centimeter ($10^{11}$ watts/cm$^2$) but above 10 Megawatts per square centimeter ($10^7$ watts/cm$^2$).

The fracturing laser beam 17 used with the present invention to excavate rock 21 is preferably a YAG, ruby, or glass laser having a pulse length in the order of nanoseconds. Energy density of tile pulsed beam is preferably a minimum of two joules/cm$^2$ and power density is preferably a minimum of $10^7$ watts/cm$^2$.

Figure 4:
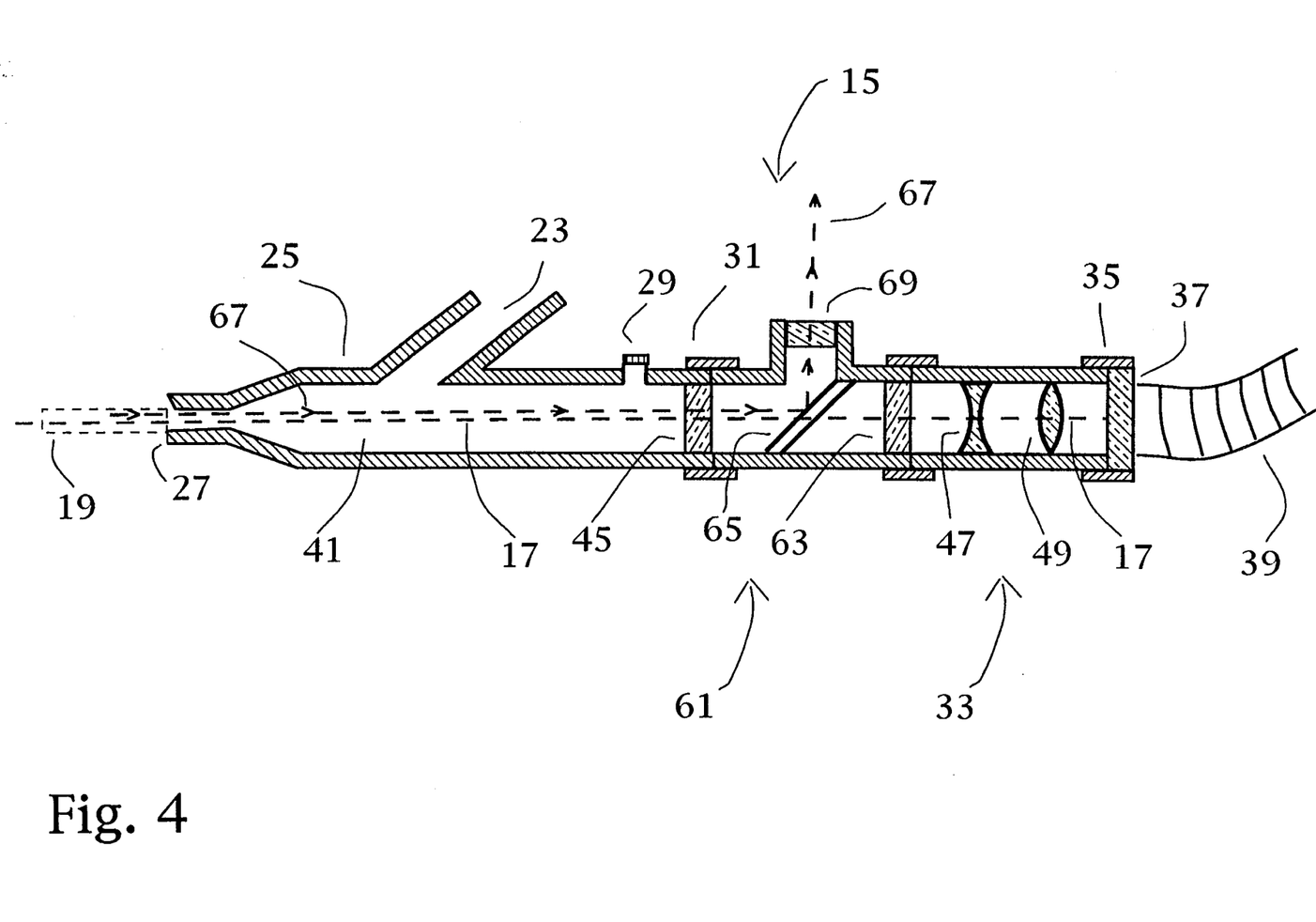
FIG. 4 shows a second embodiment of an excavator of the present invention in longitudinal sectional side view. This view illustrates a mirror chamber interposed between the fluid flow chamber and the lens chamber.

FIG. 4 illustrates in sectional side view a second embodiment of excavator 15 of the present invention. Mirror chamber 61 is interposed between flow chamber 41 and lens chamber 33. In this embodiment, flow chamber window 45 protects mirror chamber 61 from elevated water pressures that are within flow chamber 41. Mirror chamber window 63 provides physical isolation while providing an optical path between mirror chamber 61 and lens chamber 33.

Mirror chamber 61 has a mirror system using one-way mirror 65. One way mirror 65 is used to protect against damage which may be caused to excavator 15 by reflected fracturing beams 67. Reflected fracturing beams 67 are alpha beams which may return to excavator 15 after having struck rock 21. One-way mirror 65 intersects an axis passing through flow chamber 41. One-way mirror 65 is located between biconcave lens 47 and flow chamber 41. Thus, one-way mirror 65 intersects an axis passing through flow chamber 41. One-way mirror 65 is disposed at a 45 degree angle to fracturing laser beam 17 and reflected fracturing beams 67. This 45 degree angle deflects returning fracturing beams 67 at right angles to the long axis of excavator 15. Deflection window 69 provides an optical passage through excavator 15 for reflected fracturing beams 67. Orientations for one-way mirror other than 45 degrees are usable. For example, with one-way mirror 65 disposed at a 90 degree angle to an axis passing through flow chamber 41 returning alpha beams would be deflected back out of excavator 15 to rock 21.

One-way mirror 65 has a reflective surface that is optically reflective to wavelengths alpha and beta. One-way mirror 65 also has a transparent surface that is optically transparent to wavelength alpha as the fracturing laser beam travels in the direction from lens chamber 33 to water outlet 27. One-way mirror 65 permits fracturing laser beam 17 to pass through one-way mirror 65 and then to proceed through flow chamber 41 to rock 21. However, one-way mirror 65 is reflective to radiation from reflected fracturing beams 67. In addition to reflection by rock 21, fracturing laser beam 17 may be reflected by the phenomenon of Stimulated Brillouin Scattering. Mirror chamber 61 is filled with a fluid which is transparent to radiation of both wavelengths alpha and beta. One-way mirror 65 is manufactured by Infrared Optical Products, Inc. of Farmingdale, N.Y. by applying selected optical coatings to a fused quartz blank.

Figure 5:
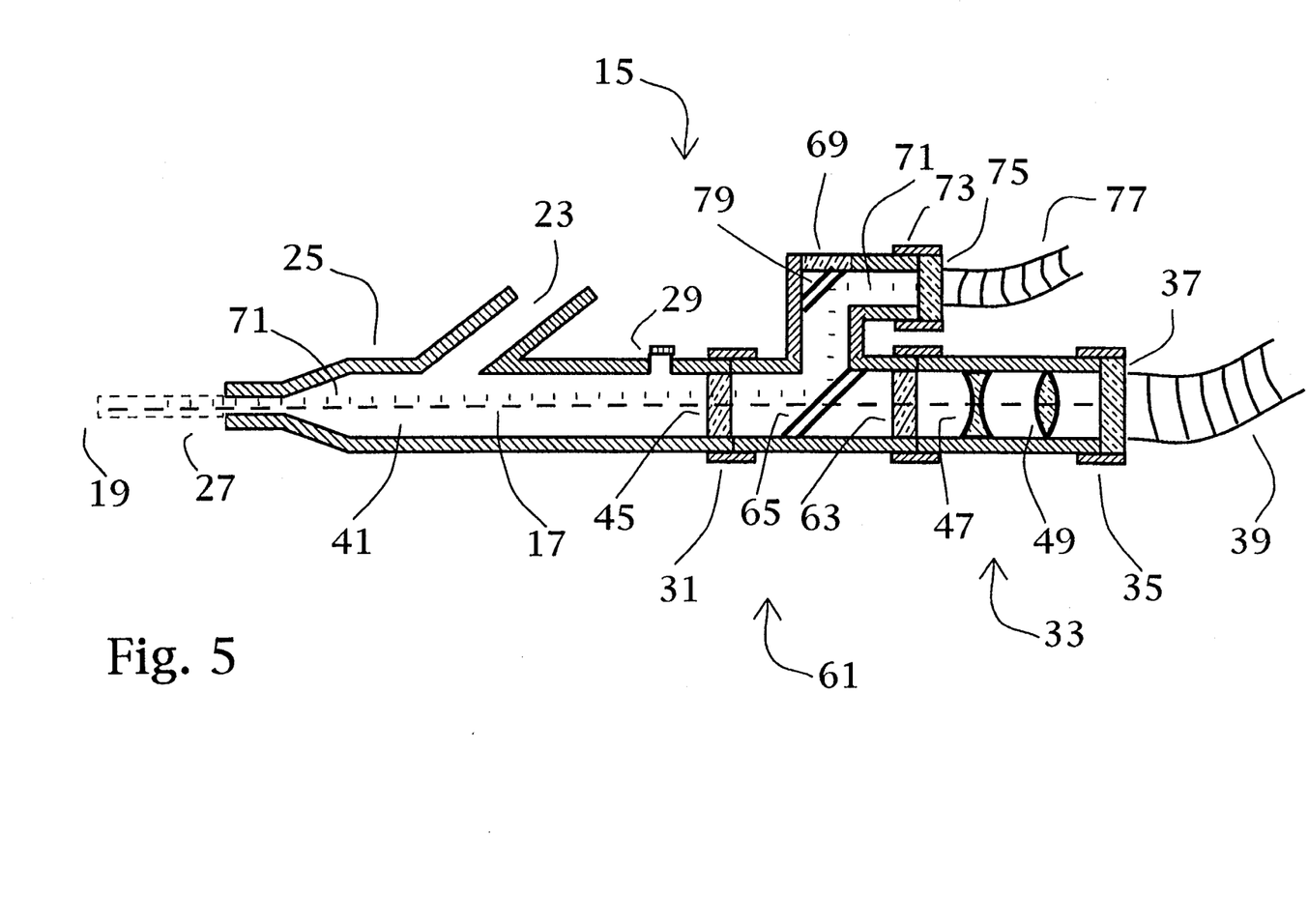
FIG. 5 shows a third embodiment of an excavator of the present invention in longitudinal sectional side view. This view illustrates a monitoring laser beam source and a selective mirror for aiming a monitoring laser beam at the mass to be fractured.

FIG. 5 illustrates in sectional side view a third embodiment of excavator 15 of the present invention. This embodiment performs the functions of the first and second embodiments. It also uses resonant frequencies to assist in fracturing rock 21. Use of resonant frequencies for fracturing a rock is described in U.S. Pat. No. 5,004,166, referred to above. This embodiment uses monitoring laser beam 71 to measure the resonant frequency of rock 21. Monitoring beam 71 is reflected off rock 21 and back into excavator 15. A control means (not shown) adjusts the frequency of fracturing laser beam 17 to match that resonant frequency.

Mirror chamber 61 has second fiber optic connector 73, second fiber optic delivery head 75, second fiber optic cable 77 and selective mirror 79. (The excavator 15 will work equally well with the monitoring laser directly connected to the mirror chamber 61 without using the second fiber optic cable 77 or fiber optic delivery head 75.) Selective mirror 79 has a mirror surface which is reflective to wavelength beta but is transparent to wavelength alpha. Selective mirror 79 reflects monitoring laser beam 71 onto one-way mirror 65. One-way mirror 65 then reflects monitoring laser beam 71 through flow chamber 41 to rock 21. Accordingly, selective mirror 79 is part of a means for aiming monitoring laser beam 71 at rock 21. Mirror chamber 61 and lens chamber 33 accordingly provide a means for aiming both monitoring laser beam 71 and fracturing laser beam 17 at rock 21.

Figure 6:
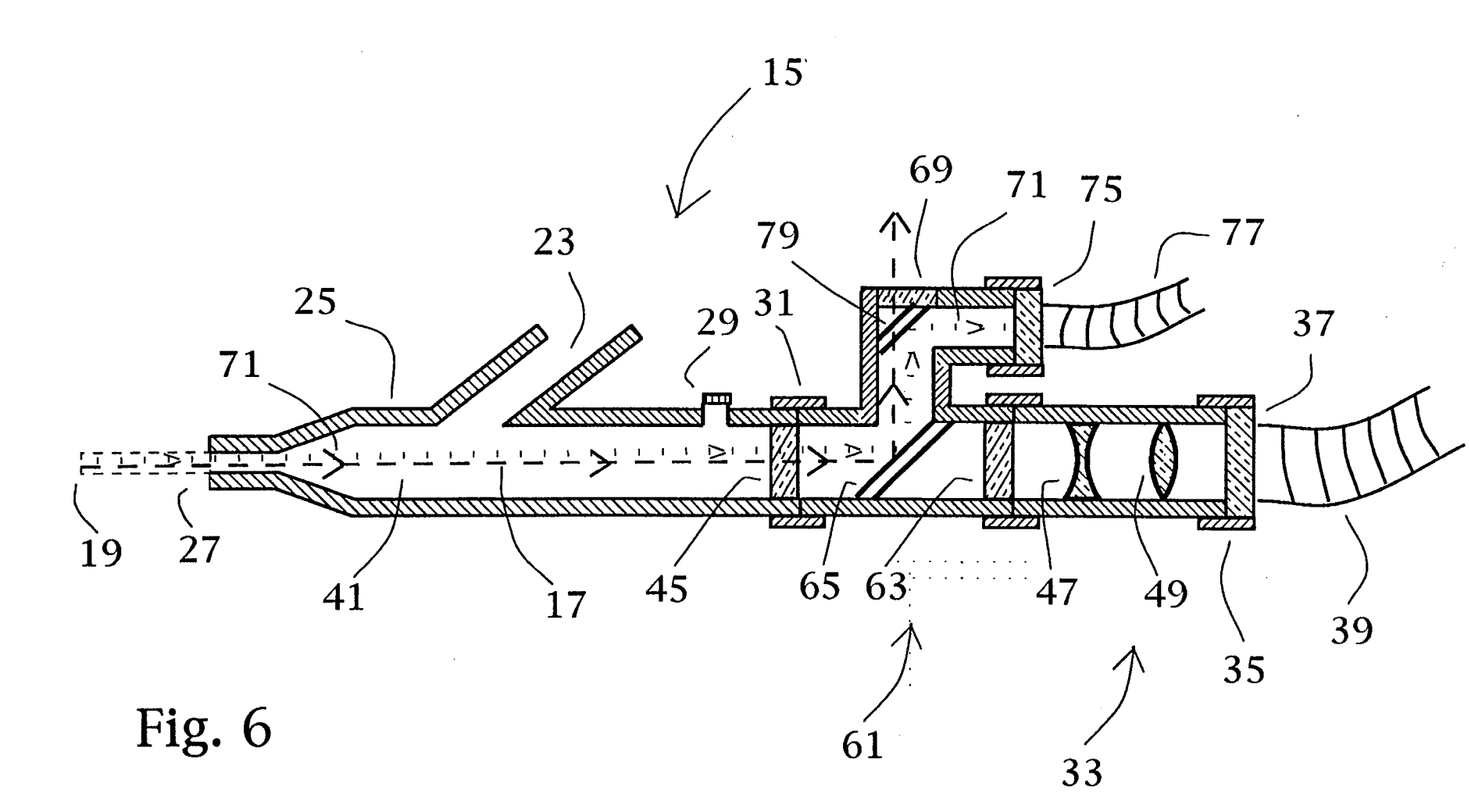
FIG. 6 shows the view of FIG. 5 except that FIG. 6 shows possible return paths of the fracturing laser beam and the monitoring laser beam after those beams are reflected off the mass.

FIG. 6 shows the view of FIG. 5 except that FIG. 5 shows return paths of the fracturing laser beam 17 and the monitoring laser beam 71 after those beams are reflected off rock 21.

Selective mirror 79 is also manufactured by Infrared Optical Products, Inc. of Farmingdale, N.Y. by applying selected optical coatings to a fused quartz blank.

One-way mirror 65 and selective mirror 79 are disposed so that light of wavelength alpha and beta traveling through water outlet 27 into flow chamber 41 is reflected by one-way mirror 65 onto selective mirror 79. Selective mirror 79 permits light of wavelength alpha to harmlessly pass through selective mirror 79 to deflection window 69 where it is dissipated. Selective mirror 79 reflects light of wavelength beta onto second fiber optic connector 73 where it is sensed by a receiver (not shown).

Figure 7:
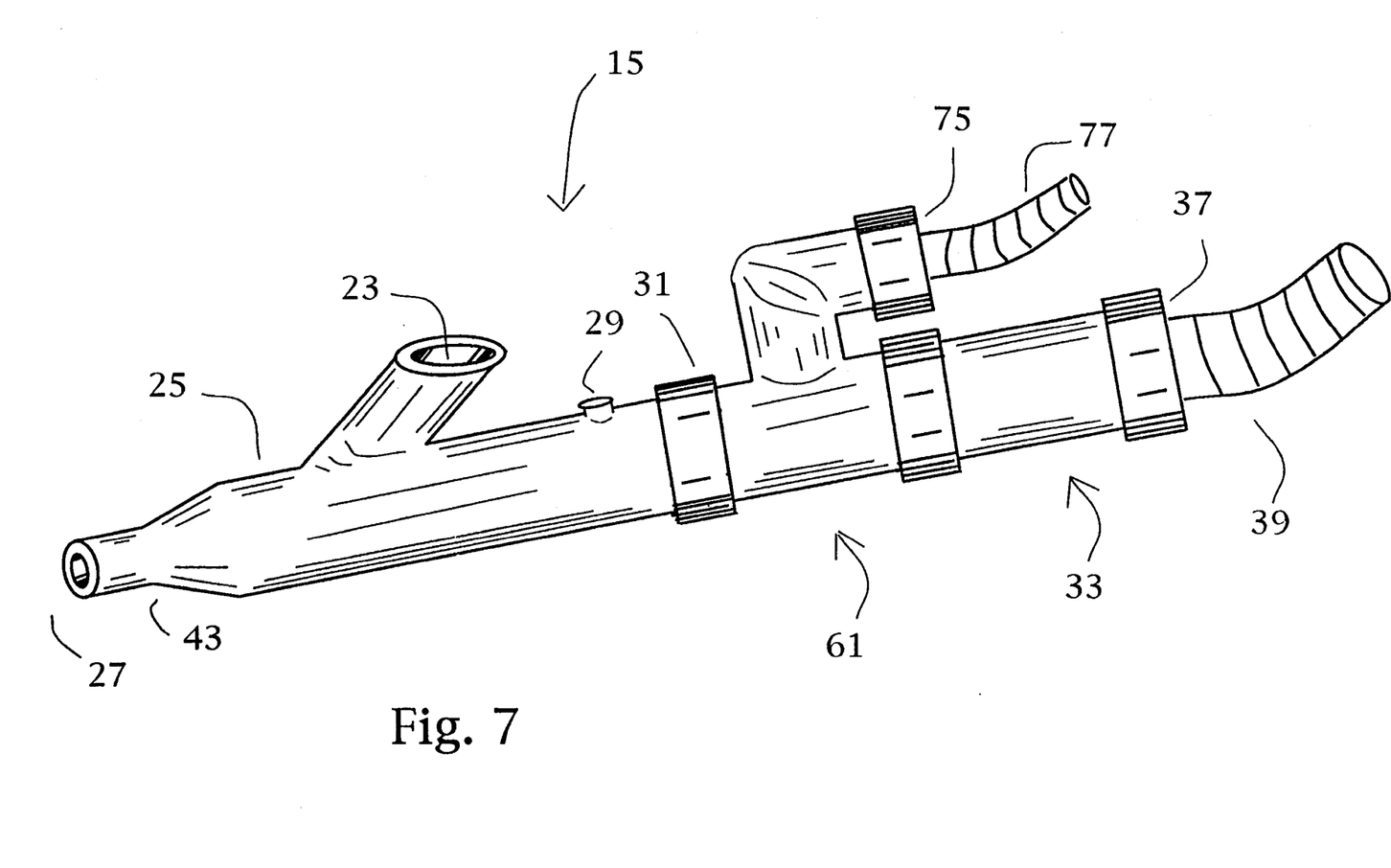
FIG. 7 is a perspective view of the excavator of FIG. 5.

FIG. 7 is a perspective view of the third embodiment of excavator 15.

Figure 8:
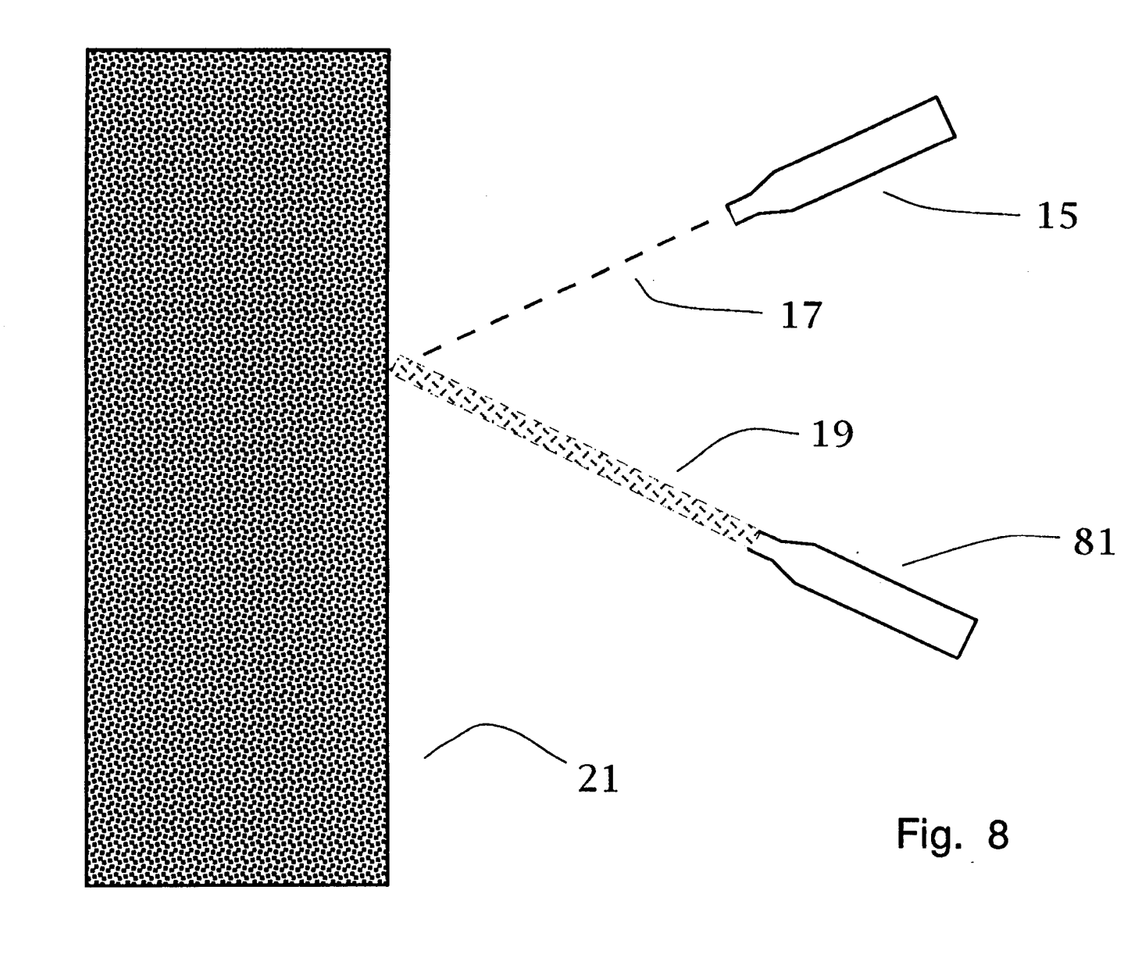
FIG. 8 is a view of an embodiment of the present invention showing a water stream directed from an angle at a mass to be fractured and showing a fracturing laser beam directed at the mass from another angle.

FIG. 8 is a view of an embodiment of the present invention showing excavator 81 directing water stream 19 from an angle at rock 21 and showing excavator 15 directing fracturing laser beam 17 rock 21 from another angle. Excavator 81 may have the same structure as excavator 15 or the laser optics may be omitted from excavator 81 since it supplies water stream 19 only.

Figure 9:
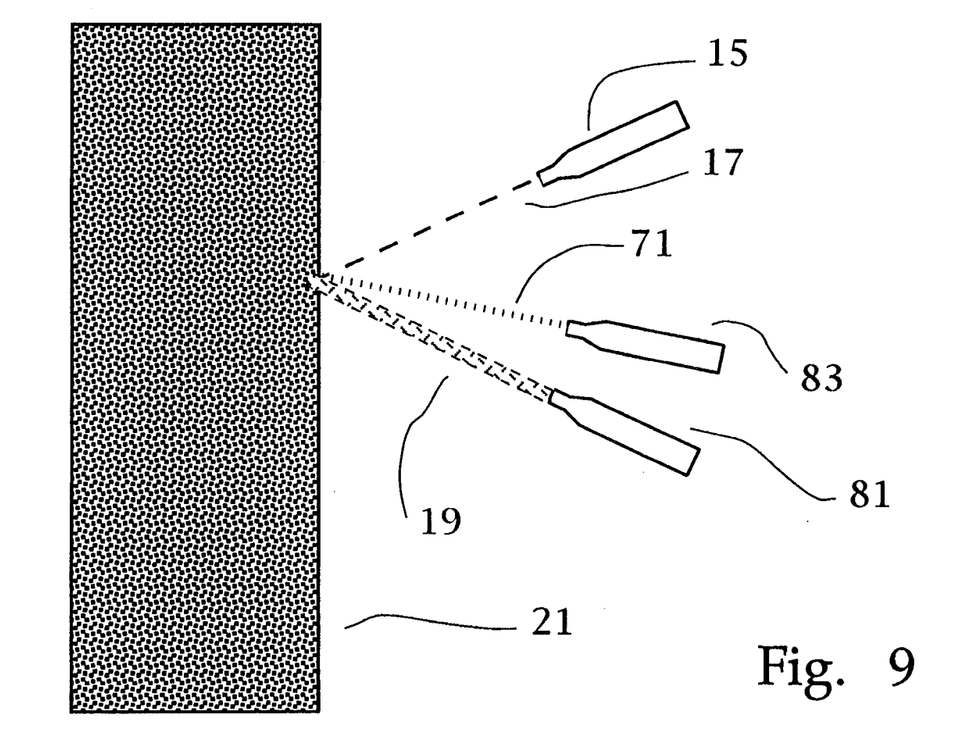
FIG. 9 is a view of the embodiment of FIG. 7 but showing a monitoring laser beam directed at the mass from yet a third angle.

FIG. 9 is a view of the embodiment of FIG. 8 and showing monitor 83 directing monitoring laser beam 71 rock 21 from yet a third angle.

Figure 10:
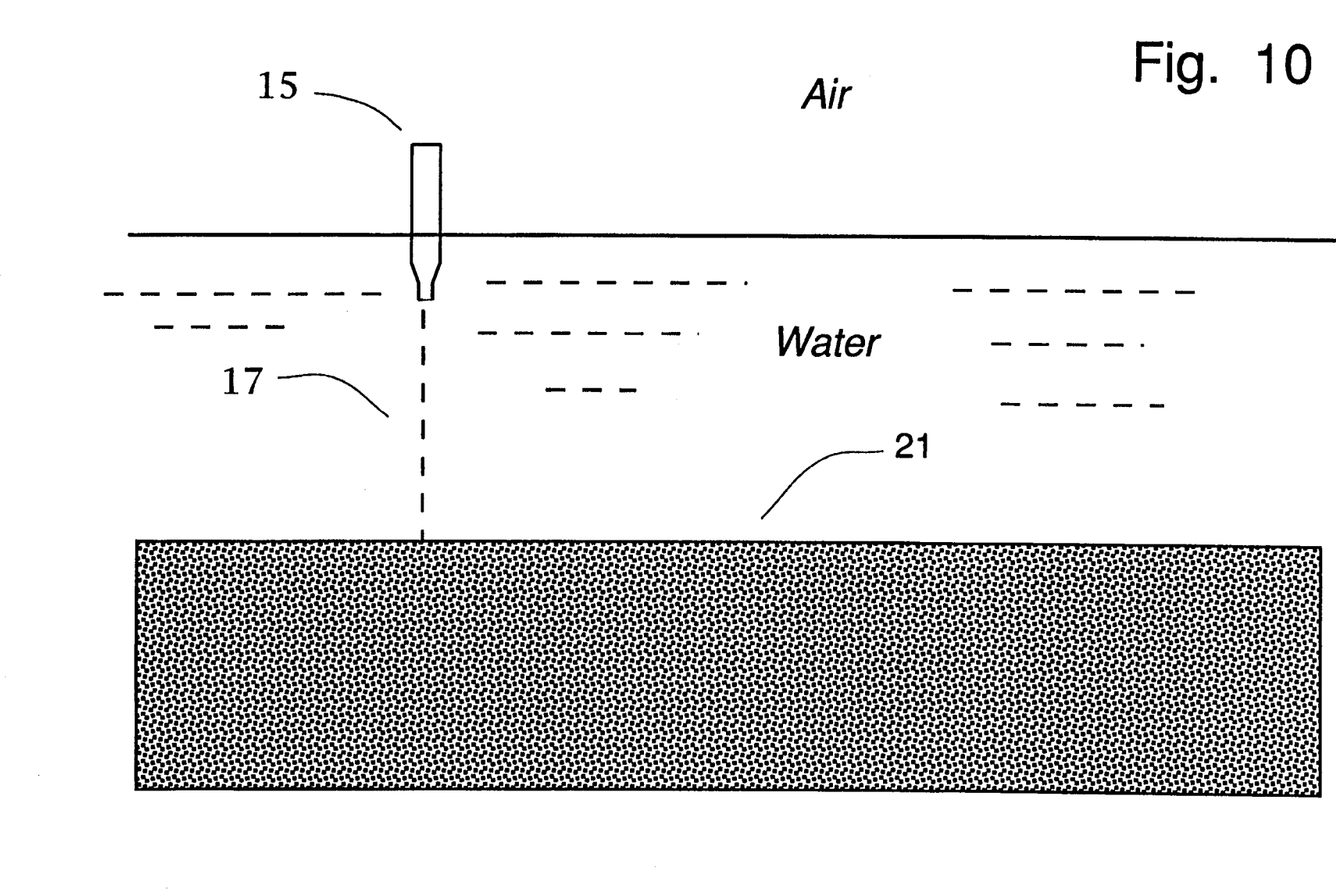
FIG. 10 is a view of an embodiment of the present invention when used to fracture a submerged mass.

FIG. 10 is a view of an embodiment of the present invention when used to fracture a submerged rock 21. Excavator 15 of this embodiment is substantially the same structure as other embodiments described above.

In each of the embodiments described above, fracturing laser beam 17 and water stream 19 combine to achieve a fracture rate for rock 21. This fracture rate is substantially higher than the fracture rate of either fracturing laser beam 17 acting alone or water stream 19 acting alone.

The present invention also provides a process for using a fracturing laser beam, a monitoring laser beam, and water to fracture a rock. This process has the steps of 110 applying water to a rock. 112 aiming a fracturing laser beam onto a particular location on the rock such that fracturing laser beam and water intersect at the particular location. In this process, the present invention achieves a fracture rate for the rock substantially higher than a fracture rate of either the fracturing laser beam or water acting alone.

This process may further have the steps of 114 converting water to a water stream; and 116 aiming that fluid stream onto the particular location. This process may yet further have a step of 118 aiming a monitoring laser beam onto the rock to monitor a resonant frequency of the rock such that the fracturing laser beam may be adjusted to match that resonant frequency.

In this process, the step of 110 applying fluid to a rock may be accomplished by submerging the rock under water or otherwise by ensuring that a steady flow of water passes over the surface of the rock.

The step of 112 aiming a fracturing laser beam onto a particular location on the rock such that fracturing laser beam and water intersect at the particular location is accomplished by aiming a laser beam having certain characteristics at the rock. A suitable laser beam is one providing a flux density of the pulsed radiation below 100 Gigawatts per square centimeter ($10^{11}$ watts/cm$^2$) but above 10 Megawatts per square centimeter ($10^7$ watts/cm$^2$). The laser is preferably a YAG, ruby, or glass laser, having a pulse length in the order of nanoseconds. Energy density of the pulsed beam is preferably a minimum of two joules/cm$^2$.

The step of 114 converting water to a water stream preferably provides a water stream having a velocity of not less than 140 feet per second measured at the point of impact with the rock when the horizontal distance between the nozzle and rock face is 24 inches.

The step of 118 aiming a monitoring laser beam onto the rock to monitor a resonant frequency of the rock such that the fracturing laser beam may be adjusted to match that resonant frequency is preferably accomplished according to the teachings of U.S. Pat. No. 5,004,166 referred to above.

Persons skilled in the art of the present invention may, upon exposure to the teachings herein, conceive other variations. Such variations are deemed to be encompassed by the disclosure, the invention being limited only by the appended claims.

I claim:

1. An apparatus for fracturing a mass of material, the apparatus comprising:

means for applying a fluid to said mass comprising a conduit having a fluid inlet, a fluid flow chamber, and a fluid outlet; said conduit for converting fluid from a pressurized fluid source into a fluid stream and for aiming said stream onto a particular location on said mass;

a fracturing laser beam for fracturing said mass; and a laser beam aiming means for aiming said fracturing laser beam onto said particular location; wherein said means for applying said fluid and said laser beam aiming means are disposed such that said fracturing laser beam is surrounded by an envelope formed by said fluid stream;

such that said fracturing laser beam and said fluid combine at said particular location to achieve a fracture rate for said mass substantially higher than a fracture rate of either said fracturing laser beam or said fluid acting on said mass alone.

2. The apparatus of claim 1 in which said flow chamber further comprises a flow chamber window which is transparent to said fracturing laser beam and which is disposed within said conduit to permit said fracturing laser beam to pass through said conduit said flow chamber window, said flow chamber, and said water outlet, respectively.

3. The apparatus of claim 2 in which said fracturing laser beam aiming means further comprises a one-way mirror, said one-way mirror being disposed between said flow chamber and said laser beam aiming means, said one-way mirror intersecting said fracturing laser beam, said one-way mirror being transparent to said fracturing laser beam when said fracturing laser beam travels in a direction of said mass but said one-way mirror being reflective to radiation from said fracturing laser beam when said radiation travels in a direction from said mass into said flow chamber.

4. The apparatus of claim 3 further comprising a selective mirror, said selective mirror and said one-way mirror being disposed so that said fracturing laser beam when traveling through said water outlet into said flow chamber is reflected by said one-way mirror onto said selective mirror;

said selective mirror being transparent to the wavelength of said fracturing laser beam to permit said fracturing laser beam to harmlessly pass through said selective mirror such that said fracturing laser beam may be dissipated.

5. The apparatus of claim 4 wherein said selective mirror and said one-way mirror are disposed so that said monitoring laser beam when traveling through said water outlet into said flow chamber is reflected by said one-way mirror onto said selective mirror;

said selective mirror reflecting said monitoring laser beam onto a connector where said monitoring laser beam is sensed by a receiver.

6. The apparatus of claim 3 in which said fracturing laser beam is pulsed at a resonant frequency of said mass.

7. The apparatus of claim 3 further comprising a monitoring laser beam for monitoring the resonant frequency of said mass.

8. The apparatus of claim 7 wherein said fracturing laser beam is pulsed at a resonant frequency of said mass.

9. The apparatus of claim 7 further comprising a selective mirror, said selective mirror and said one-way mirror being disposed so that said fracturing laser beam when traveling through said water outlet into said flow chamber is reflected by said one-way mirror onto said selective mirror;

said selective mirror being transparent to the wavelength of said fracturing laser beam to permit said fracturing laser beam to harmlessly pass through said selective mirror such that said fracturing laser beam may be dissipated.

10. The apparatus of claim 9 wherein said selective mirror and said one-way mirror are disposed so that said monitoring laser beam when traveling through said water outlet into said flow chamber is reflected by said one-way mirror onto said selective mirror;

said selective mirror reflecting said monitoring laser beam onto a connector where said monitoring laser beam is sensed by a receiver.

11. The apparatus of claim 1 further comprising means for removing air that is trapped within said flow chamber from said flow chamber.

12. An apparatus for fracturing a mass of material, the apparatus comprising:

a pulsing laser beam having a wavelength alpha;

a monitoring laser beam having a wavelength beta;

a conduit for converting water from a pressurized water source into a stream;

said conduit having an inlet, a flow chamber, a nozzle, an outlet, an air bleed valve, and a flow chamber window; said conduit being adapted to permit said pressurized water to flow through said conduit to said mass by way of said inlet, said flow chamber, said nozzle, and said outlet, respectively; said pressurized water forming a stream upon its exit from said outlet; said air bleed valve being adapted to permit removal of air from said flow chamber; said flow chamber window being transparent to laser radiation having wavelengths alpha and beta, said conduit having a beam path adapted to permit said pulsing laser beam and said monitoring laser beam to pass through said conduit to said mass by way of said flow chamber window, said flow chamber, said outlet, respectively; said beam path being longitudinally enveloped by a cylinder formed by said stream;

a beam aiming means for aiming said monitoring laser beam and said pulsing beam through said conduit to said mass by way of said beam path;

said beam aiming means having a lens chamber for housing a lens system; said lens system for focusing said pulsing beam onto said mass; said beam aiming means having a mirror chamber housing a mirror system for aiming said monitoring laser beam through said beam path; said lens system comprising a biconvex lens and a biconcave lens, said biconvex lens and biconcave lens disposed on an optical axis passing through said beam path; said biconvex lens and biconcave lens being adjustable to provide selectable focal points; said mirror system comprising a one-way mirror and a selective mirror; said one-way mirror intersecting said optical axis and said one-way mirror being located between said lens system and said flow chamber window; said one-way mirror having a reflective surface that is optically reflective to wavelengths alpha and beta and a transparent surface that is optically transparent to wavelength alpha; said one-way mirror disposed to permit said pulsing beam to pass through said one-way mirror and then through said beam path; said selective mirror having a surface reflective to wavelength beta but transparent to wavelength alpha; said one-way mirror and said selective mirror disposed to permit said selective mirror to reflect said monitoring laser beam onto said one-way mirror and to permit said one-way mirror to then reflect said monitoring laser beam through said beam path; said one-way mirror and said selective mirror being further disposed so that light of wavelengths alpha and beta traveling into said conduit by way of said inlet is reflected by said one-way mirror onto said selective mirror; which selective mirror further reflects said light of wavelength beta onto said second fiber optic connector where it is sensed by a receiver; which selective mirror permits said reflected light of wavelength alpha to pass through said selective mirror allowing said reflected light of wavelength alpha to be dissipated;

such that said pulsing beam and said stream combine to achieve a fracture rate for said mass substantially higher than a fracture rate of either said pulsing beam or said stream acting alone.

13. A process for using a fracturing laser beam, and a fluid to fracture a mass of material, the process comprising the steps of:

applying said fluid to said mass; wherein said step of applying said fluid to said mass comprises the steps of converting said fluid to a fluid stream and aiming said fluid stream onto a particular location on said mass;

aiming said fracturing laser beam onto said particular location; and aiming a monitoring laser beam onto said mass to monitor a resonant frequency of said mass such that said fracturing laser beam may be adjusted to match said resonant frequency;

such that said fracturing laser beam and said fluid combine at said particular location to achieve a fracture rate for said mass substantially higher than a fracture rate of either said fracturing laser beam or said fluid acting alone.

14. The process of claim 13 further comprising a step of adjusting said fracturing laser beam to match said resonant frequency.

15. The process of claim 14 wherein said fluid is a liquid.

16. The process of claim 15 wherein said liquid is water.

17. The process of claim 13 wherein said fluid is a liquid.

18. The process of claim 17 wherein said fluid is water.

19. The process of claim 13 wherein said step of applying said fluid stream to said mass is performed by surrounding said fracturing laser beam by am envelope formed by said fluid stream.

20. The process of claim 19 wherein said envelope is a cylindrical fluid envelope.

* * * * *